(12) United States Patent
Jallouli et al.

(10) Patent No.: US 6,417,322 B1
(45) Date of Patent: Jul. 9, 2002

(54) EPISULFIDE BASED POLYMERIZABLE COMPOSITION CATALYZED BY AN (ALKOXYPHENYL)PHOSPHINE, ARTICLES MADE THEREFROM AND PROCESS FOR MAKING SAME

(75) Inventors: Aref Ben Ahmed Jallouli, Largo; Gabriel Keita, Oldsmar; Steven Weber, Clearwater; Yassin Turshani, Largo, all of FL (US)

(73) Assignee: Essilor International Compagnie General d'Optique, Charenton Cedex (FR)

( * ) Notice: Subject to any disclaimer, the term of this patent is extended or adjusted under 35 U.S.C. 154(b) by 0 days.

(21) Appl. No.: 09/669,099

(22) Filed: Sep. 25, 2000

(51) Int. Cl.⁷ .......................... C08G 75/00; C08G 75/14
(52) U.S. Cl. ........................ 528/373; 528/374; 528/377; 528/456; 528/487; 523/427; 523/428; 359/642
(58) Field of Search .................................. 528/373, 374, 528/377, 456, 487; 523/427, 428; 359/642

(56) References Cited

U.S. PATENT DOCUMENTS

| 4,662,376 A | | 5/1987 | Belanger ..................... 128/361 |
| 4,675,328 A | | 6/1987 | Cassal et al. ................. 514/345 |
| 4,775,733 A | | 10/1988 | Kanemura et al. ............. 528/67 |
| 5,945,504 A | * | 8/1999 | Amagai et al. ............. 528/373 |
| 6,117,923 A | * | 9/2000 | Amagai et al. ............. 523/440 |

FOREIGN PATENT DOCUMENTS

| EP | 271839 | 6/1988 |
| EP | 394495 | 10/1990 |
| EP | 921417 | 6/1999 |
| EP | 942027 | 9/1999 |

* cited by examiner

Primary Examiner—Duc Truong
(74) Attorney, Agent, or Firm—Fulbright & Jaworski L.L.P.

(57) ABSTRACT

The room temperature polymerizable composition comprises at least one polymerizable monomer having at least one episulfide functionality and an effective amount of at least one (alkoxyphenyl)phosphine polymerization catalyst.

27 Claims, No Drawings

EPISULFIDE BASED POLYMERIZABLE COMPOSITION CATALYZED BY AN (ALKOXYPHENYL)PHOSPHINE, ARTICLES MADE THEREFROM AND PROCESS FOR MAKING SAME

BACKGROUND OF THE INVENTION (1) Field of the Invention

The present invention relates to polymerizable compositions, polymerized resins, and in particular fast curing compositions at room temperature as well as to a polymerization process for making such resin.

The polymerized compositions and the polymerization process of the invention are particularly useful for making transparent optical articles such as lenses, prisms, optical fibers, filters or for making different types of substrates, such as information recording substrates.

The polymerizable composition and the polymerization process of the invention are also specifically suited for making various coatings and in particular coatings for optical applications.

(2) Description of the Prior Art

Transparent plastic materials are widely used in the optical field and particularly in the ophthalmic field for their lightness, high impact resistance.

Optically transparent plastic materials having a high refractive index $n_D = 1.6$ or even higher have been developed recently which render it possible to manufacture optical articles such as lenses of lower thickness for an equivalent corrective power (optical power).

EP 0.921.417 discloses a polymerizable composition comprising a sulfur-containing compound having at least one episulfide functionality, a compound having one ore more active hydrogen atoms in one molecule, at least one of the active hydrogen atoms being an active hydrogen atom other than hydrogen atom of SH group, and optionally a polymerization catalyst.

Among the cited polymerization catalysts are the phosphines. The disclosed phosphines include trialkylphosphines and tricycloalkylphosphines, triphenylphosphine, tribenzilphosphine, tri(alkylphenyl)phosphines, dialkyl and dicycloalkylphenylphosphines, alkyl and cycloalkyldiphenylphosphines, and chlorodiphenylphosphine.

Document EP 0.942.027 discloses a polymerizable composition comprising a (thio)epoxy compound having at least one intramolecular disulfide bond and a polymerization catalyst. Among the numerous polymerization catalysts that can be used, trialkylphosphines and triarylphosphines are cited.

Unfortunately, the polymerization of these polymerizable compositions needs a long thermal polymerization cycle, generally between 8 hours to 17 or more in order to obtain fully polymerized articles.

SUMMARY OF THE INVENTION

Thus, the aim of the present invention is to provide polymerizable compositions for making optically transparent resins which are thermally polymerizable and preferably polymerizable at room temperature in a short time cycle.

A further object of the invention is to provide polymerizable compositions as above which result in polymerizable resins having a high refractive index of 1.6 or more, and preferably of 1.7 or more.

The invention also concerns a polymerization process for making optically transparent resins which necessitates shorter time than the prior art processes.

The invention further concerns optical articles such as lenses made of the resins resulting from the polymerization of the polymerizable compositions.

It has now been discovered that, by using an effective amount of an alkoxyphenylphosphine as part of the catalyst or preferably as the sole catalyst in polymerizable compositions including at least one episulfide monomer, it was possible to use very short polymerization cycles while still obtaining a polymerized resin which is optically transparent and free of striations and having good mechanical, scratch and heat resistance properties.

According to the present invention, there is a risk provided thermally or room temperature polymerizable compositions for making optically transparent resins and comprising at least one polymerizable monomer having at least one episulfide functionality and an effective amount of a polymerization catalyst, comprising a phosphine having at least one alkoxyphenyl group. More specifically, the polymerization catalyst is selected from phosphines of formula (I):

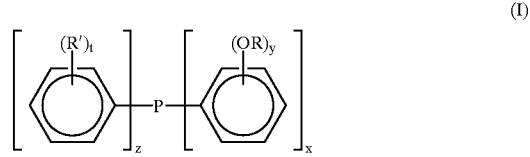

and mixtures thereof, in which R and R' are alkyl groups, x is an integer from 1 to 3, y is an integer from 1 to 3 and z in an integer from 0 to 2 with the proviso that x+z=3, t is 0, 1, 2 or 3.

Preferably, the catalyst consists solely in the (alkoxyphenyl)phosphine of formula (I) or a mixture of these phosphines.

DETAILED DESCRIPTION OF THE INVENTION AND PREFERRED EMBODIMENTS

The (alkoxyphenyl)phosphine catalyst of formula (I) may comprise 1 to 3 alkoxy phenyl groups (x is 1, 2 or 3). The preferred (alkoxyphenyl)phosphine catalysts of formula (I) are tris(alkoxyphenyl)phosphines (i.e. :z=0)

The alkoxyphenyl groups of the phosphines of formula (I) may be monoalkoxy, dialkoxy or trialkoxyphenyl groups.

Preferably, the alkoxyphenyl groups are mono and dialkoxy groups, most preferably monoalkoxy groups.

The alkyl radical R in the alkoxy groups OR is generally selected from $C_1-C_6$ alkyl groups, preferably $C_1-C_4$ alkyl groups. Most preferably, R is $CH_3$.

In mono alkoxyphenyl groups, the alkoxy group is usually in position 3 or 4 on the phenyl ring, preferably in position 4. In the dialkoxyphenyl group, the alkoxy groups are preferably in position 2 and 6 of the phenyl ring whereas in trialkoxyphenyl groups, the alkoxy groups are preferably in position 2, 4 and 6 on the phenyl ring.

The alkyl radical R' is generally selected from $C_1-C_6$ alkyl groups, preferably $C_1-C_4$ alkyl groups, such as methyl, ethyl and propyl.

The most preferred phosphine catalysts are tris(monoalkoxy)phosphines.

Among the preferred alkoxyphenylphosphines of formula (I), there may be cited tris(3-methoxyphenyl)phosphine, tris(4-methoxyphenyl)phosphine, tris(2,6-dimethoxyphenyl)phosphine and tris(2,4,6-trimethoxyphenyl)phosphine. The most preferred phosphine is tris(4-methoxyphenyl)phosphine which gives the best compromise between a fast polymerization reaction and a non charring system.

The alkoxyphenylphosphine catalyst shall be used in the polymerizable compositions in an effective amount i.e. an amount sufficient to promote the polymerization, particularly the room temperature polymerization, of the composition.

The effective amount of phosphine catalysts will obviously depend upon the phosphine catalyst itself and the nature of the monomer or mixture of monomers of the composition in order to obtain a fast polymerization while avoiding charring of the system.

Generally, the phosphine catalyst will be present in amounts ranging, based on the total weight of the polymerizable monomers, from 5 to 1800 parts per million (ppm), preferably 100 to 800 ppm and more preferably 200 to 700 ppm.

Preferably, the phosphine catalyst is added to the monomer mixture as a solution in an appropriate solvent. Solvents that can be used are tetrahydrofuran (THF), chloroform, water, N-methyl-2-pyrrolidone (NMP) and N,N-dimethylacetamide (DMAC). Preferred solvents are THF, NMP and DMAC.

The polymerizable episulfide monomers of the invention have at least one episulfide functionality and preferably two ore more episulfide functionalities per molecule.

Preferably, the polymerizable monomers having at least one episulfide functionality are compounds having one or more episulfide structures represented by the following formula (II) in one molecule:

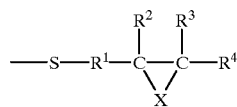

(II)

In which $R^1$ represents a hydrocarbon group having 1 to 10 carbon atoms, $R^2$, $R^3$ and $R^4$ each represents an hydrogen atom or a hydrocarbon group having 1 to 10 carbon atoms, X represents S or O with the proviso that in the molecule the average number of S represented by X is about 50% of the total number of S and O constituting the three membered ring.

A preferred class of polymerizable episulfide monomer is represented by compound of formula (III):

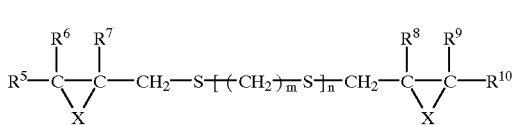

(III)

in which $R^5$, $R^6$, $R^7$, $R^8$, $R^9$ and $R^{10}$ each represents an hydrogen atom or a hydrocarbon group having 1 to 10 carbon atoms, X represents S or O with the proviso that, in the molecule, the average number of S represented by X is about 50% or more of the total number of S and O constituting the three member rings, m represents an integer from 0 to 6 and n represents an integer from 0 to 4.

Preferably, $R^1$ in formula (II) represents a methylene group or ethylene group and $R^2$, $R^3$ and $R^4$ in formula (II) and $R^5$, $R^6$, $R^7$, $R^8$, $R^9$ and $R^{10}$ in formula (III) each preferably represents a hydrogen atom or a methyl group. It is more preferable that $R^1$ represents a methylene group and $R^2$, $R^3$, $R^4$, $R^5$, $R^6$; $R^7$, $R^8$, $R^9$ and $R^{10}$ each represents a hydrogen atom.

The average number of S in each of formula (II) and formula (III) is 50% or more, preferably 90% or more, more preferably 95% or more and more preferably substantially 100% of the total number of S and O constituting the three member rings.

Examples of these compounds include linear organic: compounds such as bis(β-epithiopropylthio)methane, 1,2-bis(β-epithiopropylthio)ethane, 1,3-bis(β-epithiopropylthio) propane, 1,2-bis(β-epithiopropylthio)propane, 1-(β-epithiopropylthio)-2-(β-epithiopropylthiomethyl)propane, 1,4-bis(β-epithiopropylthio)butane, 1,3-bis(β-epithiopropylthio)butane, 1-(β-epithiopropylthio)-3-(β-epithiopropylthiomehtyl)butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl) thio] ethane and 1-(β-epithiopropylthio)-2-[[2-2β-epithiopropylthioethyl) thioethyl]thio]ethane; branched organic compounds such as tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl)thiomethyl]-3-7-dithianonane, 1,10 bis(β-epithiopropylthio)-5,6-bis[2-β-epithiopropylthioethyl)thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthio methyl)-3,6,9-trithiaundecane, 1,11-bis(β-epithiopropylthio)-5,7-[(2-β-epithiopropylthio)thiomethyl]-3,6,9-trithiaundecane and 1,11-bis(β-epithiopropylthio)-4,7-bis(β-epithiopropylthiomethyl)-3,6,9-trithiaundecane; and compounds obtained by substituting at least one hydrogen atom of the episulfide group in the above compounds with methyl group, cyclic aliphatic organic compounds such as 1,3- and 1,4-bis(β-epithiopropylthio)cyclohexanes, 1,3- and 1,4-bis (β-epithiopropylthiomethyl)cyclohexanes, bis[4-(β-epithiopropylthio)cyclohexyl]methane, 2,2-bis[4-(β-epithiopropylthio)cyclohexyl]propane, bis[4-(β-epithiopropylthio)cyclohexyl] sulfide, 2,5-bis(β-epithiopropylthiomethyl)-1,4-dithiane and 2,5-bis(β-epithiopropylthioethylthiomethyl)-1,4-dithiane; and compounds obtained by substituting at least one hydrogen atom of the episulfide group in the above compounds with methyl group and aromatic organic compounds such as 1,3- and 1,4-bis(β-epithiopropylthio)benzenes, 1,3- and 1,4-bis (β-epithiopropylthiomethyl)benzenes, bis[4-(β-epithiopropylthio)phenyl]methane, 2,2-bis[4-(β-epithiopropylthio)phenyl]propane, bis[4-(β-epithiopropylthio)phenyl] sulfide, bis[4-(β- epithiopropylthio)phenyl]sulfone and 4,4'-bis(β-epithiopropylthio)biphenyl; and compounds obtained by substituting at least one hydrogen atom of the episulfide group in the above compounds with methyl group. However, compound (a) is not limited to the above compounds shown as examples. The above compounds may be used singly or as a mixture of two or more compounds.

A most preferred episulfide compound is bis-(β-epithiopropyl)sulfide of formula:

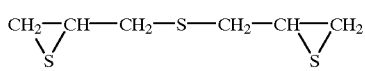
(IV)

These compounds are disclosed in EP 0.921.417.

The polymerizable composition of the invention may include solely a polymerizable episulfide monomer or a mixture of polymerizable episulfide monomers or it may also optionally include one or more other monomer(s) copolymerizable with the episulfide monomer(s). In particular, it may include one ore more other monomer(s) having two or more functional groups which are reactive with the episulfide group(s) and/or the epoxy group(s) of the episulfide monomers, a monomer having one or more functional groups which are reactive with the episulfide group(s) and/or the epoxy group(s) of the episulfide monomers and one or more other homopolymerizable functional groups or a monomer having one homopolymerizable functional group which is reactive with the episulfide and/or the epoxy group.

These other polymerizable monomers, when used in the polymerizable composition of the invention, may represent up to 50% by weight of the total weight of the monomers present in the composition and preferably 20% and more preferably 10% by weight or less of the total weight of the monomers present in the polymerizable composition.

Among these other polymers, there may be cited polythiol monomers having two or more, preferably two or three, thiol functions.

The polythiol monomers can be represented by formula (V):

$$R'(SH)_{n'}$$ (V)

in which n' is an integer from 2 to 6 and preferably 2 to 3, and R' is an organic group of valency equal to n'.

Useful polythiol monomers are those disclosed in EP-A-394.495 and U.S. Pat. No. 4,775,733 and the polythiols corresponding to the following formulas:

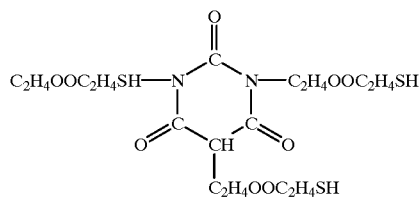

and $$C_2H_5C(CH_2COOCH_2CH_2SH)_3$$

Among the preferred polythiol monomers there may be cited aliphatic polythiols such as pentaerythritol tetrakis mercaptoprionate. 1-(1'-mercaptoethylthio)-2-3-dimercaptopropane, 1-(2'-mercaptopropylthio)-2,3-dimnercaptopropane, 1-(3'-mercaptopropylthio)-2,3 dimercaptopropane, 1-(4'-mercaptobutylthio)-2,3-dimercaptopropane, 1-(5'-mercaptopentylthio)-2,3 dimercapto-propane, 1-(6'-mercaptohexylthio)-2,3-dimercaptopropane, 1,2bis(-4'-mercaptobutylthio)-3-mercaptopropane, 1,2-bis(5'-mercaptopentylthio)-3-mercaptopropane, 1,2bis(6'-mercaptohexyl)-3-mercaptopropane, 1,2,3-tris(mercaptomethylthio)propane, 1,2,3-tris(3'-mercaptopropylthio)propane, 1,2,3-tris(2'-mercaptoethylthio)propane, 1,2,3-tris(4'-mercaptobutylthio) propane, 1,2,3-tris(6'-mercaptohexylthio)propane, methanedithiol, 1,2-ethanedithiol, 1,1-propanedithiol 1,2-propanedithiol, 1,3-propanedithiol, 2,2-propanedithiol, 1,6-hexanethiol-1,2,3-propanetrithiol, and 1,2-bis(2'-mercaptoethylthio)-3-mercaptopropane.

Preferred polythiol monomers are bis(2,2'-thioethyl) sulfide, 1,2bis(2'-mercaptoethylthio)-3-mercaptopropane and pentaerythritol tetrakis mercaptopropionate.

Among the other monomers, there may also be cited monomers including one or more (meth)acrylate functionalities. Examples of such monomers are benzyl acrylate, benzyl methacrylate, butoxyethyl acrylate, butoxymethyl methacrylate, cyclohexyl acrylate, cyclohexyl methacrylate, 2-hydroxyethyl acrylate, 2-hydroxyethyl methacrylate, glycidyl acrylate, glycidyl methacrylate, phenoxyethyl acrylate, phenoxyethyl methacrylate, phenyl methacrylate, 3-phenoxy-2-hydroxypropyl acrylate, ethyleneglycol diacrylate, ethyleneglycol dimethacrylate, diethyleneglycol dimethacrylate, triethyleneglycol diacrylate, triethyleneglycol dimethacrylate, tetraethyleneglycol diacrylate, tetraethyleneglycol dimethacrylate, polyethyleneglycol diacrylate, polyethyleneglycol dimethacrylate, neopentylglycol diacrylate, neopentylglycol dimethacrylate, ethyleneglycol-bisglycidyl diacrylate, ethyleneglycolbisglycidyl dimnethacrylate, bisphenol-A diacrylate, bisphenol-A dimethacrylate, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl) propane, bisphenol-F diacrylate, bisphenol-F dimethacrylate, 1,1-bis(4-acryloxyethoxyphenyl)methane, 1,1-bis(4-methacryloxyethoxy phenyl)methane, 1,1-bis(4-

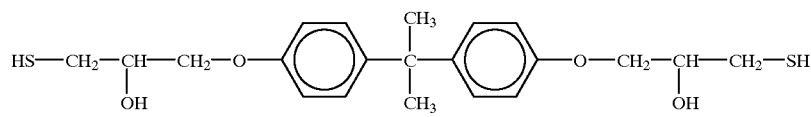

acryloxydiethoxyphenyl)methane, 1,1-bis(4-methacryloxydiethoxy phenyl)methane, 1,1-bis(4-methacryloxydiethoxyphenyl)methane, dimethyloltricyclodecane diacrylate, trimethylolpropane triacrylate, trimethylolpropane trimethtacrylate, glycerol diacrylate, glycerol dimethacrylate, pentaerythritol triacrylate, pentaerythritol tetraacrylate, pentaerythritol tetramethacrylate, methylthio acrylate, methylthio methacrylate, phenylthio acrylate, benzylthio methacrylate, xylenedithiol diacrylate, xylenedithiol dimethacrylate, mercaptoethylsulfide diacrylate and mercaptoethylsulfide dimethacrylate; allyl compounds such as allyl glycidyl ether, diallyl phthalate, diallyl terephthalate, diallyl isophthalate, diallyl carbonate and diethyleneglycol-bisallyl carbonate, vinyl compounds such as styrene, chlorostyrene, methylstyrene, bromostyrene, dibromostyrene, divinylbenzene and 3,9-divinyl-spiro-bis-(m-dioxane); and diisopropenylbenzene.

A preferred (meth)acrylate monomer is 2-hydroxy-3-phenoxypropyl acrylate.

The polymerizable composition according to the invention may also include additives which are conventionally employed in polymerizable compositions intended for moulding optical articles, in particular ophthalmic lenses, in conventional proportions, namely inhibitors, dyes, UV absorbers, perfumes, deodorants, antioxydants, antiyellowing agents and release agents.

The perfumes allow the odour of the composition to be masked, in particular during surfacing or routering operations.

In particular, usual UV absorbers such as those commercialized under the tradenames UV 5411®, UV 9®, Tinuvin 400®, Tinuvin P® and Tinuvin 312® may be used in amounts generally up to 0.4% by weight of the total polymerizable monomers weight.

Also, the compositions of the invention preferably comprises release agents in an amount up to 0.1% by weight of the total polymerizable monomers weight.

Among the release agents, there may be cited mono and dialkylphsphates, silicones, fluorinated hydrocarbons, fatty acids and ammonium salts. The preferred release agents are mono and dialkylphosphates and mixtures thereof. Such release agents are disclosed interalia in document U.S. Pat. Nos. 4,662,376, 4,675,328 and EP-271.839.

The compositions of the present invention are very reactive at room temperature, and a gel can be obtained within a polymerization time of 1 to 60 minutes, usually less than 15 minutes.

In the following examples, unless otherwise stated, all the percentages and parts are in weight.

EXAMPLE 1 and Comparative Examples C1 and C2

Mixtures containing 9 g of bis(β-epithiopropyl)sulfide (component A) and 0.5 g of 2-hydroxy-3-phenoxypropylacrylate (component C) were placed in glass vials. To these mixtures, they were added a solution of different catalysts, the solvent and 0,5 g of bis(2,2'-thioethyl) sulfide (component B). The mixtures were stirred magnetically for about 10 seconds and then kept at room temperature without stirring. The polymerized materials have a thickness of about 5 mm and a diameter of about 46 mm.

The nature and quantity of catalyst used, the nature of the solvent and the gel time are reported in Table I.

TABLE I

| Example N° | Catalyst (ppm) | Solvent | Gel time (minutes) |
|---|---|---|---|
| C1 | φ$_3$P (607) | THF | No gel after 1 hour |
| C2 | (4-Me φ)$_3$P (559) | THF | 90 |
| 1 | (4-MeO φ)$_3$P (577) | THF | 8 |

φ$_3$P: Triphenyl phosphine
(4-Me φ)$_3$P: Tris(4-methylphenyl)phosphine
(4-MeO φ)$_3$P: Tris(4-methoxyphenyl)phosphine

EXAMPLES 2 TO 5

Several experiments were conducted as in example 1 using tris(4-methoxyphenyl) phosphine as catalyst and different percentages of the components A, B and C in the formulations.

Monomer formulations and gel time are given in Table II below:

TABLE II

| | Monomer Formulation (%) | | | Catalyst | |
|---|---|---|---|---|---|
| Example N° | A | B | C | (ppm) | Gel time (minutes) |
| 2 | 99.36 | 0 | 0 | 491 | 20 |
| 3 | 89.38 | 4.88 | 5.21 | 577 | 8 |
| 4 | 89.42 | 5.05 | 4.91 | 636 | 7 |
| 5 | 89.40 | 4.95 | 5.04 | 599 | 9 |

EXAMPLES 6 TO 11

Several experiments were carried out as in example 1 using tris(4-methoxyphenyl)phosphine as catalyst and replacing component B by an equivalent weight of pentaerythritol tetrakis mercaptopropionate (component D) or 1,2bis(2'-mercaptoethyldhio)-3 mercaptopropane (component E).

The formulations and results are given in Table III:

TABLE III

| Example No | Monomer Formulation (%) | | | | | Catalyst (ppm) | Gel time (minutes) |
|---|---|---|---|---|---|---|---|
| | A | B | C | D | E | | |
| 6 | 88.61 | — | 4.95 | 5.65 | — | 662 | 13 |
| 7 | 89.22 | 5.02 | 4.98 | — | — | 600 | 8 |
| 8 | 88.68 | — | 4.93 | 5.55 | — | 573 | 40 |
| 9 | 89.68 | 4.51 | 5.01 | — | — | 577 | 13 |
| 10 | 86.19 | — | 4.98 | — | 8.19 | 584 | 7 |
| 11 | 89.38 | 4.88 | 5.21 | — | — | 577 | 7 |

EXAMPLES 12 TO 17

Plano lenses were molded in plano molds having flat sides. The molds were closed with a tape material. The formulations used contained 36 g of component A, 2 g of component B, 2 g of component C and variable amounts of tris(4-methoxyphenyl)phosphine catalyst dissolved in tetrahydrofuran. The molded lenses were 5 mm thick and 85 mm in diameter.

The amounts of catalyst used and the gel times are given in Table IV.

TABLE IV

| Example N° | Catalyst (ppm) | Gel time (minutes) |
| --- | --- | --- |
| 12 | 572 | 90 < t < 150 |
| 13 | 599 | 10 |
| 14 | 596 | 10 |
| 15 | 628 | 10 |
| 16 | 654 | 6 |
| 17 | 687 | 6 |

EXAMPLES 18 TO 22

2 mm thick and 85 mm diameter lenses were molded using plano molds having flat sides from a formulation containing approximately 19.14 g of component A, 1.06 g of component B and 1.07 g of component C and variable amounts of tris(4-methoxyphenyl)phosphine catalyst disclosed in 1-methyl-2-pyrrolidone NMP). The molds were closed with a tape material.

Catalyst concentrations and resulting gel times are given in Table V.

TABLE V

| Example N° | Catalyst (ppm) | Gel time (minutes) |
| --- | --- | --- |
| 18 | 589 | 26 |
| 19 | 602 | 26 |
| 20 | 705 | 20 |
| 21 | 904 | 16 |
| 22 | 1190 | 12 |

Surprisingly, as shown by Table V, higher amount of catalyst can be used when molding 2 mm thick plano lenses than 5 mm thick piano lenses without charring.

While not being bound by any theory, it is believed that this result can be explained by the higher value of the ratio surface/volume in the case of the 2 mm thick lenses resulting in a higher efficiency of the heat exchange during the exothermic polymerization reaction.

As shown by the examples, episulfide monomer based composition may be fast polymerized at room temperature using (alkoxyphenyl)phosphine catalysts according to the invention.

What is claimed is:

1. A polymerizable composition comprising at least one polymerizable monomer having at least one episulfide functionality and an effective amount of a polymerization catalyst comprising a phosphine having at least one alkoxyphenyl group.

2. The polymerizable composition of claim 1, wherein the polymerization catalyst is selected among phosphines of formula (I):

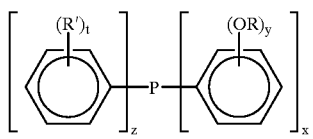

(I)

and mixtures thereof,
in which R and R' are alkyl groups, x is an integer from 1 to 3, y is an integer from 1 to 3, z is an integer from 0 to 2 with the proviso that x+y=3, t is 0, 1, 2 or 3.

3. The polymerizable composition as in claim 2, wherein R is selected from $C_1$–$C_6$ alkyl groups.

4. The polymerizable composition as in claim 3, wherein R is $CH_3$.

5. The polymerizable composition as in claim 2, wherein x=3 and y=1.

6. The polymerizable composition as in claim 5, wherein the alkoxy group is in position 4 of the phenyl ring.

7. The polymerizable composition as in claim 2, wherein the polymerization catalyst is selected from: tris(3-methoxyphenyl)phosphine, tris(4-methoxyphenyl)phosphine, tris(2,6-dimethoxyphenyl)phosphine and tris(2,4,6-trimethoxyphenyl)phosphine.

8. The polymerizable composition as in claim 1, wherein the polymerizable monomer having at least one episulfide functionality is a compound having one or more structures represented by the following formula (II) in one molecule:

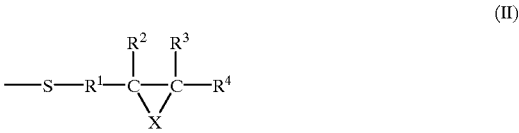

(II)

in which $R^1$ represents a hydrocarbon group having 1 to 10 carbon atoms, $R^2$, $R^3$ and $R^4$ each represents a hydrogen atom or a hydrocarbon group having 1 to 10 carbon atoms, X represents S or O with the proviso that in the molecule the average number of S represented by X is about 50% or more of the total number of S and O constituting the three-membered rings.

9. The polymerizable composition as in claim 8, wherein X is S.

10. The polymerizable composition as in claim 8, wherein the compound having one or more structures of formula (II) comprises two structures of formula (II).

11. The polymerizable composition in claim 10, wherein X is S.

12. The polymerizable composition as in claim 1, wherein the polymerizable monomer having at least one episulfide functionality is a compound represented by the formula (III):

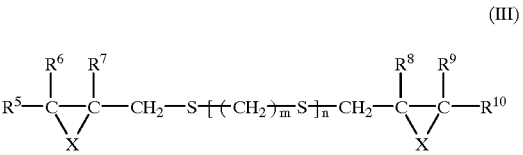

(III)

in which $R^5$ to $R^{10}$ each represents hydrogen atom or a hydrocarbon group having 1 to 10 carbon atoms, X represents S or O with the proviso that in the molecule the average number of S represented by X is about 50% or more of the total number of S and O constituting the three-membered rings, m represents an integer from 0 to 6 and n represents an integer from 0 to 4.

13. The polymerizable composition as in claim 12, wherein X is S.

14. The polymerizable composition as in claim 12, wherein the olymerizable monomer having at least one episulfide functionality is bis(β-epithiopropyl) sulfide.

15. The polymerizable composition as in claim 1 further comprising at least one other monomer copolymerizable with the episulfide monomer.

16. The polymerizable composition as in claim 15, wherein said other polymerizable monomer is a polythiol having two or more thiol functions.

17. The polymerizable composition as in claim 16, wherein the polythiol compound is bis(2,2'-thioethyl)

sulfide, pentaerythitol tetrakis mercaptopropionate or 1,2 bis(2'-mercaptoethylthio)-3 mercaptopropane.

18. The polymerizable composition as in claim 15, wherein the said other copolymerizable monomer is a monomer having one or more (meth)acrylate functionalities.

19. The polymerization composition as in claim 18, wherein said other monomer is 2-hydroxy-3-phenoxypropylacrylate.

20. The polymerizable composition as in claim 15, wherein said other copolymerizable monomer represents 10% by weight or less of the total weight of the polymerizable monomers present in the composition.

21. A cast optical article made of a polymerized composition as set forth in claim 1.

22. An ophthalmic lens made of a polymerized composition as set forth in claim 1.

23. The cast optical article of claim 21 having a refractive index of at least 1.7.

24. The ophthalmic lens of claim 22 having a refractive index of at least 1.7.

25. A process for fast polymerization at room temperature of a composition comprising at least one polymerizable monomer having at least one episulfide functionality which comprises adding to the composition an effective amount of a catalyst selected from phosphines of formula (I):

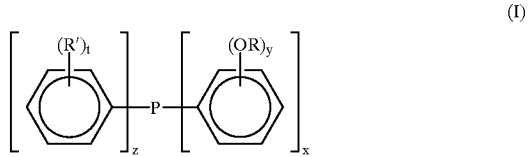

and mixtures thereof,
    in which R and R' are alkyl groups, x is an integer from 1 to 3 and y is an integer from 1 to 3, z is an integer from 0 to 2 with the proviso that x+y=3, t is 0, 1, 2 or 3.

26. The process of claim 25, wherein the polymerization catalyst is selected from tris(4-methoxyphenyl)phosphine, tris(2,6-dimethoxyphenyl)phosphine and tris(2,4,6-trimethoxyphenyl)phosphine.

27. The process of claim 25, wherein the polymerization catalyst is tris(4-methoxyphenyl)-phosphine.

\* \* \* \* \*